US012743817B2

(12) United States Patent
Gao

(10) Patent No.: US 12,743,817 B2
(45) Date of Patent: Sep. 22, 2026

(54) METHOD FOR ENCODING AND DECODING FOR TRISOUP VERTEX POSITIONS

(71) Applicant: Beijing Xiaomi Mobile Software Co., Ltd., Beijing (CN)

(72) Inventor: Shuo Gao, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 5 days.

(21) Appl. No.: 18/854,882

(22) PCT Filed: Apr. 11, 2022

(86) PCT No.: PCT/CN2022/086189

§ 371 (c)(1),
(2) Date: Oct. 7, 2024

(87) PCT Pub. No.: WO2023/197122

PCT Pub. Date: Oct. 19, 2023

(65) Prior Publication Data

US 2025/0245863 A1 Jul. 31, 2025

(51) Int. Cl.
*G06T 9/40* (2006.01)
*H04N 19/96* (2014.01)

(52) U.S. Cl.
CPC ............... *G06T 9/40* (2013.01); *H04N 19/96* (2014.11)

(58) Field of Classification Search
None
See application file for complete search history.

(56) References Cited

U.S. PATENT DOCUMENTS

| | | | |
|---|---|---|---|
| 10,192,353 | B1 | 1/2019 | Chou et al. |
| 2021/0166435 | A1 | 6/2021 | Lasserre et al. |

FOREIGN PATENT DOCUMENTS

| | | | |
|---|---|---|---|
| CN | 111465964 | A | 7/2020 |
| CN | 113766228 | A | 12/2021 |
| TW | 202143724 | A | 11/2021 |

OTHER PUBLICATIONS

Chaofei Wang1, Wenjie Zhu1, Yingzhan Xu1, Yiling Xu1, Le Yang2, "Point-Voting based Point Cloud Geometry Compression", 2021 IEEE 23rd International Workshop on Multimedia Signal Processing (MMSP) (Year: 2021).*
International Search Report Issued in Application No. PCT/CN2022/086189, Sep. 13, 2022, WIPO, 6 pages.

(Continued)

*Primary Examiner* — Xiaolan Xu
(74) *Attorney, Agent, or Firm* — Finnegan, Henderson, Farabow, Garrett & Dunner, L.L.P.

(57) ABSTRACT

A method for encoding a three-dimensional (3D) point cloud into a bitstream, includes: obtaining octree information including an octree structure of a volume, wherein the octree structure includes a plurality of cuboids as leaf nodes of the octree structure; providing a threshold range; determining vertex positions $V_j$ on edges of each cuboid as vertex information, wherein the vertex position Vj on the respective edge is determined by points of the point cloud in a distance to the respective edge smaller than the threshold range; and encoding the octree information and the vertex information into a bitstream; wherein the threshold range is dependent on the sizes of the cuboids.

18 Claims, 7 Drawing Sheets

(56) References Cited

OTHER PUBLICATIONS

Written Opinion of the International Searching Authority Issued in Application No. PCT/CN2022/086189, Sep. 13, 2022, WIPO, 5 pages.
Chaofei Wang et al., "Point-Voting based Point Cloud Geometry Compression", 2021 IEEE 23rd International Workshop on Multimedia Signal Processing (MMSP), Oct. 6, 2021, 5 pages.
State Intellectual Property Office of the People's Republic of China, Office Action and Search Report Issued in Application No. 202280016557.7, Apr. 24, 2026, 11 pages.
Zhang Lupeng, "An Algorithm for Octree Volume Model that Adapted to Cutting Simulation of Deformable Objects", Academic Master's Degree Thesis, Qingdao University, May 2018, 53 pages.

* cited by examiner

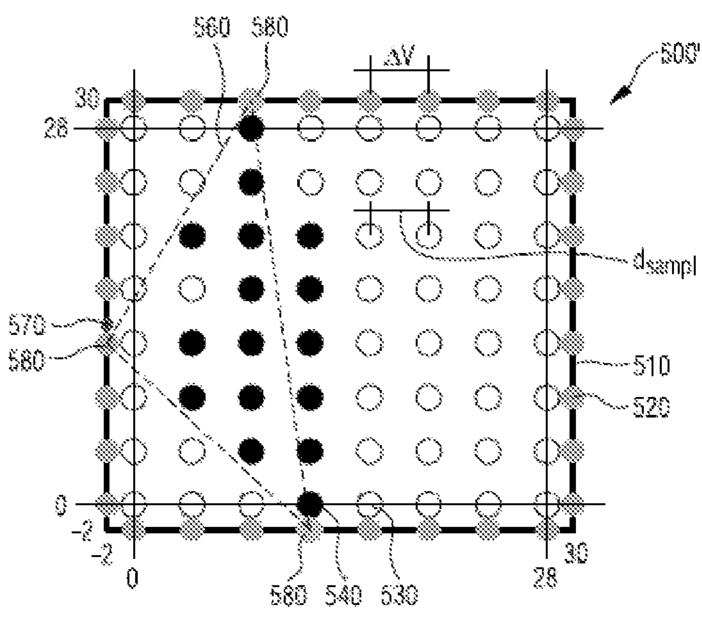

FIG. 13

Receiving and decoding a bitstream, wherein the bitstream contains octree information including information about octree structure of the volume of the point cloud and vertex information including information about vertex presence and position of a vertex on edges of cuboids of leaf nodes of the octree structure — S10

Determining triangles by connecting the vertices of one cuboid relating to a leaf node of the octree structure — S11

Voxelization of the triangles to determine points of the decoded point cloud — S12

FIG. 14

METHOD FOR ENCODING AND DECODING FOR TRISOUP VERTEX POSITIONS

CROSS REFERENCE TO RELATED APPLICATIONS

This application is a U.S. National Stage of International Application No. PCT/CN2022/086189, filed on Apr. 11, 2022, the disclosure of which is incorporated herein by reference in its entirety.

TECHNICAL FIELD

The present invention relates to a method for decoding a three-dimensional (3D) point cloud from a bitstream. Additionally, it is an object of the present invention to provide a method for encoding a 3D point cloud into a bitstream. Further, it is an object of the present invention to provide an encoder and decoder, a bitstream encoded according to the present invention and a software. In particular, it is an object of the present invention to provide a method with increased accuracy of the decoding or reconstruction process of a 3D point cloud.

BACKGROUND

As a format for the representation of 3D data, point clouds have recently gained traction as they are versatile in their capability in representing all types of 3D objects or scenes. Therefore, many use cases can be addressed by point clouds, among which are

- movie post-production,
- real-time 3D immersive telepresence or VR/AR applications,
- free viewpoint video (for instance for sports viewing),
- Geographical Information Systems (aka cartography),
- culture heritage (storage of scans of rare objects into a digital form),
- Autonomous driving, including 3D mapping of the environment and real-time Lidar data acquisition.

A point cloud is a set of points located in a 3D space, optionally with additional values attached to each of the points. These additional values are usually called point attributes. Consequently, a point cloud is combination of a geometry (the 3D position of each point) and attributes.

Attributes may be, for example, three-component colors, material properties like reflectance and/or two-component normal vectors to a surface associated with the point.

Point clouds may be captured by various types of devices like an array of cameras, depth sensors, Lidars, scanners, or may be computer-generated (in movie post-production for example). Depending on the use cases, points clouds may have from thousands to up to billions of points for cartography applications.

Raw representations of point clouds require a very high number of bits per point, with at least a dozen of bits per spatial component X, Y or Z, and optionally more bits for the attribute(s), for instance three times 10 bits for the colors. Practical deployment of point-cloud-based applications requires compression technologies that enable the storage and distribution of point clouds with reasonable storage and transmission infrastructures.

Compression may be lossy (like in video compression) for the distribution to and visualization by an end-user, for example on AR/VR glasses or any other 3D-capable device. Other use cases do require lossless compression, like medical applications or autonomous driving, to avoid altering the results of a decision obtained from the analysis of the compressed and transmitted point cloud.

Until recently, point cloud compression (aka PCC) was not addressed by the mass market and no standardized point cloud codec was available. In 2017, the standardization working group ISO/JCT1/SC29/WG11, also known as Moving Picture Experts Group or MPEG, has initiated work items on point cloud compression. This has led to two standards, namely

- MPEG-I part 5 (ISO/IEC 23090-5) or Video-based Point Cloud Compression (V-PCC) and
- MPEG-I part 9 (ISO/IEC 23090-9) or Geometry-based Point Cloud Compression (G-PCC).

Both V-PCC and G-PCC standards have finalized their first version in late 2020 and will soon be available to the market.

The V-PCC coding method compresses a point cloud by performing multiple projections of a 3D object to obtain two-dimentional (2D) patches that are packed into an image (or a video when dealing with moving point clouds). Obtained images or videos are then compressed using already existing image/video codecs, allowing for the leverage of already deployed image and video solutions. By its very nature, V-PCC is efficient only on dense and continuous point clouds because image/video codecs are unable to compress non-smooth patches as would be obtained from the projection of, for example, Lidar-acquired sparse geometry data.

The G-PCC coding method has two schemes for the compression of the geometry.

The first scheme is based on an occupancy tree (octree/quadtree/binary tree) representation of the point cloud geometry. Occupied nodes are split down until a certain size is reached, and occupied leaf nodes provide the location of points, typically at the center of these nodes. By using neighbor-based prediction techniques, high level of compression can be obtained for dense point clouds. Sparse point clouds are also addressed by directly coding the position of point within a node with non-minimal size, by stopping the tree construction when only isolated points are present in a node; this technique is known as Direct Coding Mode (DCM).

The second scheme is based on a predictive tree, each node representing the 3D location of one point and the relation between nodes is spatial prediction from parent to children. This method can only address sparse point clouds and offers the advantage of lower latency and simpler decoding than the occupancy tree. However, compression performance is only marginally better, and the encoding is complex, relatively to the first occupancy-based method, intensively looking for the best predictor (among a long list of potential predictors) when constructing the predictive tree.

In both schemes, attribute (de) coding is performed after complete geometry (de) coding, leading to a two-pass coding. Thus, low latency is obtained by using slices that decompose the 3D space into sub-volumes that are coded independently, without prediction between the sub-volumes. This may heavily impact the compression performance when many slices are used.

An important use case is the transmission of dynamic AR/VR point clouds. Dynamic means that the point cloud evolves with respect to time. Also, AR/VR point clouds are typically locally 2D as they most of time represent the surface of an object. As such, AR/VR point clouds are highly connected (or said to be dense) in the sense that a point is rarely isolated and, instead, has many neighbors.

Dense (or solid) point clouds represent continuous surfaces with a resolution such that volumes (small cubes called voxels) associated with points touch each other without exhibiting any visual hole in the surface.

Such point clouds are typically used in AR/VR environments and are viewed by the end user through a device like a TV, a smartphone or a headset. They are transmitted to the device or stored locally. Many AR/VR applications use moving point clouds, as opposed to static point clouds, that vary with time. Therefore, the volume of data is huge and must be compressed. Nowadays, lossless compression based on an octree representation of the geometry of the point cloud can achieve down to slightly less than a bit per point (1 bpp). This may not be sufficient for real time transmission that may involve several millions of points per frame with a frame rate as high as 50 frames per second (fps), thus leading to hundreds of megabits of data per second.

Consequently, lossy compression may be used with the usual requirement of maintaining an acceptable visual quality while compressing sufficiently to fit within the bandwidth provided by the transmission channel while maintaining real time transmission of the frames. In many applications, bitrates as low as 0.1 bpp (10× more compressed than lossless coding) would already make possible real time transmission.

The codec VPCC based on MPEG-I part 5 (ISO/IEC 23090-5) or Video-based Point Cloud Compression (V-PCC) can achieve such low bitrates by using lossy compression of video codecs that compress 2D frames obtained from the projection of the point cloud on a plane. The geometry is represented by a series of projection patches assembled into a frame, each patch being a small local depth map. However, VPCC is not versatile and is limited to a narrow type of point clouds that do not exhibit locally complex geometry (like trees, hair) because the obtained projected depth map would not be smooth enough to be efficiently compressed by a video codec.

Purely 3D compression techniques can handle any type of point clouds. It is still an open question whether 3D compression techniques can compete with VPCC (or any projection plus image coding scheme) on dense point clouds. Standardization is still under its way toward offering an extension (an amendment) of GPCC that would provide competitive lossy compression that would compress dense point clouds as good as VPCC intra while maintaining the versatility of GPCC that can handle any type of point clouds (dense, Lidar, 3D maps). This extension is likely to use the so-called TriSoup coding scheme that works over to an octree. TriSoup is under exploration in the standardization working group JTC1/SC29/WG7 of ISO/IEC. TriSoup encoding is also known A. DRICOT, et al, "Adaptive multi-level triangle soup for geometry-based point cloud coding", 2019, IEEE 21st international workshop on multimedia signal processing (MMSP), Nakagami O.: "report on triangle soup decoding", ISO/IEC JTC1/SC29-WG11 m52279, 2020, and U.S. Pat. No. 10,192,353.

In lossy compression of octree geometry coding, several compression rates are defined to satisfy different bandwidth demands. The size of a leaf node under lower compression rate is larger than that of higher compression rate.

However, when encoding the octree geometry, size of the respective leaf nodes is not considered during vertex determination process leading to inaccuracy of the encoded geometry information and consequently to a loss of accuracy for the decoded 3D point cloud geometry.

SUMMARY

The problem is solved by a method for encoding according to claim 1, a method for decoding according to claim 12, an encoder according to claim 13, a decoder according to claim 14, a bitstream according to claim 15 and a software according to claim 16.

In a first aspect of the present invention a method for encoding a 3D point cloud into a bitstream is provided preferably implemented in an encoder. The method for encoding the 3D point cloud includes:

- obtaining octree information including an octree structure of a volume, wherein the octree structure includes a plurality of cuboids as leaf nodes of the octree structure; determining a threshold range;
- determining vertex positions $V_j$ on edges of each cuboid as vertex information, wherein the vertex position $V_j$ on the respective edge is determined by points of the point cloud in a distance to the respective edge smaller than the threshold range; and
- encoding the octree information and the vertex information into a bitstream; wherein the threshold range is dependent on the size of the cuboids.

Thus, in a first step octree information is obtained from point cloud data which may be acquired by a device such as a LIDAR device or the like, including an octree structure of a volume containing the 3D point cloud. Therein, the octree structure includes a plurality of cuboids as leaf nodes of the octree structure. Thus, by the leaf nodes of the octree structure, the volume of the 3D point cloud is divided into cuboids containing the points of the point cloud.

In a further step, a threshold range is determined. Therein, the threshold range is dependent on the size of the cuboids. Thus, the threshold range is different for different sizes of the cuboids and may be larger for larger cuboids.

In a further step, the vertex positions $V_j$ on edges of each cuboid are determined as vertex information. Therein, the vertex position $V_j$ on the respective edge j is determined by the points of the point cloud in a distance to the respective edge smaller than the threshold range. Thus, for determining the vertex position $V_j$ on the edges only those points in the respective cuboid are considered which are close to the respective edge and in particular closer to the respective edge than the threshold range.

Subsequently, the octree information and the vertex information are encoded into the bitstream.

Hence, by adapting the threshold range to the size of the cuboids of the octree structure, different threshold ranges can be implemented in order to consider a sufficient number of points in the point cloud when determining the vertex positions. In particular, for larger sizes of the cuboids of the leaf nodes, points of the point cloud might be spaced apart from the respective edge. This would result in neglecting these points for determining the respective vertex position $V_j$ and may lead to an inaccuracy for the vertex position $V_j$ on the respective edge. In extrema, if no points are within the threshold range relative to the respective edge, no vertex at all is determined on the respective edge thereby neglecting all other points within the present leaf node which are farer away from the respective edge than the threshold range. In particular, for large sizes of cuboids this problem becomes more and more apparent and would lead to an increasing inaccuracy of the 3D point cloud geometry when decoded at the decoder side. By adapting the threshold range depended on the size of the cuboids, more points might be considered and missing of relevant points is prevented. Thus, by adapting the threshold range to the size of the cuboids, accuracy of the encoding is enhanced thereby providing better results for the decoded 3D point cloud geometry at the decoder side.

Preferably, the bitstream is encoded with a TriSoup encoding scheme by the encoder.

Preferably, the geometry of the point cloud and in particular the octree structure is encoded by Geometry-based Point Cloud Compression (G-PCC).

Preferably, the bitstream is an MPEG G-PCC compliant bitstream.

Preferably, the threshold range comprises a first threshold range $t1_{min}$ and at least one second threshold range $t2_{min}$, wherein the at least one second threshold range $t2_{min}$ is larger than the first threshold range $t1_{min}$. Further, the first threshold range $t1_{min}$ may be fixed, having a fixed value. Further, according to the present invention the at least second threshold range $t2_{min}$ is dependent on the size of the cuboids. Thus, in particular by the first threshold range $t1_{min}$, the current situation of the prior art is implemented. Hence by implementing the at least one second threshold range $t2_{min}$, the size of the cuboids is considered without the need to fundamentally adapt the current encoding scheme. Thus, by the first threshold range $t1_{min}$ and the second threshold range $t2_{min}$ two ranges are defined, wherein points of the point cloud considered for determining the vertex position $V_j$ might be either within the first threshold range $t1_{min}$ or the second threshold range $t2_{min}$.

Preferably, the first threshold range $t1_{min}$ is equal to one in the unit of sampling resolution of original point cloud data acquired by devices.

Preferably, the threshold range and more preferably, the at least one second threshold range $t2_{min}$ is determined on the basis of the sampling distance $d_{sampl}$ of the point cloud. Therein, the sampling distance is a property of the initial point cloud data and relates to the distance between the actual sampling points of the volume of the point cloud in units of the sampling resolution if there is no missing points during data acquiring. Therein, $d_{sampl}$ is set by for example the device acquiring the point of the point cloud, such as a LIDAR or the like.

Preferably, the sampling distance $d_{sampl}$ of the point cloud is determined by $$d_{sampl} = \sqrt{\frac{N_{leaf}}{N_{total}}} \cdot N$$

with $N_{leaf}$ being the number of leaf nodes in the volume, $N_{total}$ being the number of points of the point cloud and N the size of the respective cuboid of the leaf node. Therein, at the encoder side $N_{total}$ in known to the encoder. Also, the number $N_{leaf}$ of leaf nodes is known at the encoder side. Further, N defines the size of the leaf node in the unit of sampling resolution of original point cloud data acquired by devices. Hence, $d_{sampl}$ can be determined from the point cloud data and is dependent on the size of the cuboids of the leaf nodes. Hence, with increasing size N of the leaf nodes, also $d_{sampl}$ increases thereby increasing the at least one second threshold range.

Preferably, the at least one second threshold range $t2_{min}$ is determined on the basis of a quantization step $\Delta V$ of the vertex position on the edge. In particular, the vertex position $V_j$ on the edges of the cuboids is quantized and calculated by $p_Q$=round ($p/\Delta V$) with p the determined position of the vertices along the respective edge of the cuboids of the leaf node from the considered points of the point cloud and $p_Q$ the quantized vertex position. Therein, the quantization step $\Delta V$ for the vertex position depends on compression rates, also have relationship with the size of the cuboids of the leaf nodes, wherein with increasing size of the cuboids of the leaf nodes also the quantization step $\Delta V$ increases thereby, at the same time increasing the at least one second threshold range $t2_{min}$.

Preferably, the quantization step $\Delta V$ is multiplied by a factor $\alpha$ when determining the at least one second threshold range $t2_{min}$. Therein a is between or equal to ⅛ and 1 and more preferably between or equal to ⅛ and ¼. Most preferably a is set to ¼. Thus, by the factor $\alpha$ a considerable threshold range is achieved increasing the accuracy of the encoding process.

Preferably, the threshold range and more preferably the at least one second threshold range $t2_{min}$ is determined by the sum of the sampling distance $d_{sampl}$ of the point cloud and the quantization step $\Delta V$. In particular, the at least one second threshold range is determined by $t2_{min}=d_{sampl}+\alpha\,\Delta V$.

Preferably, $t2_{min}$ is set to 1 for small cuboids. Thus, for small cuboids the likelihood of missing points is small and therefore extension of the range by $t2_{min}$ might not be necessary. This is in particular applicable where the cuboid size N is approximately in the range of $2*t2_{min}$ to $4*t2_{min}$.

Preferably, the positions of the points are weighted depending on the distance to the respective edge when determining the vertex position. Thus, the larger the distance of the respective points to the edge of the leaf node, the less influence these points have on the determining of the vertex position $V_j$. Thus, although the present position of the points in the leaf node are considered when determining the vertex position, the determination of the vertex position is dominated by the points of the point cloud close to the respective edge.

Preferably, points of the point cloud in a distance to the respective edge smaller than the first threshold range $t1_{min}$ are weighted by a first weight (or weighting factor) W1 and points of a point cloud in a distance to the respective edge smaller than the second threshold range $t2_{min}$ are weighted by a second weight (or weighting factor) W2. Therein, W1 is larger than W2 such that positions of the points in a distance to the respective edge smaller than the at least one second threshold range have less impact than positions of the points in a distance to the respective edge smaller than the first threshold when determining the respective vertex position.

Preferably, the weights or weighting factors W1 and W2 are fixed values, wherein preferably W1 is set to be between 1 and 4 and more preferably W1=2. Alternatively or additionally W2 is preferably set to be between 0.2 and 2 and more preferably W2=1.

Preferably, the weight W1 is determined by the ratio of the second threshold range $t2_{min}$ and the first threshold range $t1_{min}$, i.e. $W1=t2_{min}/t1_{min}$ and W2=1.

Preferably, the vertex position $V_j$ on the respective edge is determined by $$V_j = (W1 \times D_{sum1} + W2 \times D_{sum2})/(W1 \times N_{closest\_p1} + W2 \times N_{closest\_p2})$$

with W1 and W2 as weighting factor, wherein W1>W2. Further, $D_{sum1}$ is the sum of the positions along the respective edge of the points in a distance to the respective edge smaller than the first threshold range $t1_{min}$, and $N_{closest\_p1}$ indicates the number of points in a distance to the respective edge smaller than the first threshold range $t1_{min}$. Similar, $D_{sum2}$ denotes the sum of the positions along the respective edge of points in a distance to the respective edge smaller than the at least one second threshold range $t2_{min}$, and $N_{closest\_p2}$ the number of points in a distance to the respective edge smaller than the at least one second threshold range $t2_{min}$. Thus, $D_{sum2}$ and $N_{closest\_p2}$ may include points within the first threshold range $t1_{min}$ (if points are present) and may further include points in a distance to the respective edge larger than the first threshold range $t1_{min}$ but smaller than the second threshold range $t2_{min}$ (if points are present).

Preferably, more than one second threshold range $ti_{min}$, $ti_{min}$, i=2, . . . , n are provided with $t2_{min}<t3_{min}< \ldots <tn_{min}$. Thus, by the more than one second threshold ranges $ti_{min}$ a plurality of ranges are determined in which points of the point cloud are considered when determining the vertex position $V_j$ on the respective edge. Further, for each of the second threshold ranges $ti_{min}$, a respective weight Wi can be determined. Then, the vertex position $V_j$ can be determined by:

$$V_j = \frac{\sum_{i=1}^{n} W_i D_{sum\,i}}{\sum_{i=1}^{n} W_i N_{closest\_pi}}.$$

Preferably, $W_i$ is set by $$W_i = \frac{t(n-i+1)_{min}}{t1_{min}}$$

and $W_n=1$.

Preferably, $ti_{min}$ is set to be $ti_{min}=(i-1)d_{sampl}+\alpha\Delta V$ with i=2, . . . , n.

In another aspect of the present invention, a method for decoding a 3D point cloud from a bitstream is provided, preferably implemented in a decoder. The method includes: receiving and decoding a bitstream, wherein the bitstream contains octree information including information about octree structure of the volume of the point cloud and vertex information including information about vertex presence and position of a vertex on edges of cuboids of leaf nodes of the octree structure;

determining triangles by connecting the vertices of one cuboid relating to a leaf node of the octree structure;

voxelization of the triangles to determine points of the decoded point cloud, wherein at least one triangle is extended along at least one side for voxelization.

Thus, in a first step a bitstream is received and the bitstream contains information regarding the octree structure of the volume of the point cloud which are decoded. Preferably, the geometry of the Point cloud is G-PCC-encoded. Thus, by decoding from the bitstream the octree information about the volume of the point could is provided. Further, the bitstream also includes vertex information including information about vertex presence and position of a vertex on edges of the cuboids relating to leaf nodes in the octree structure. Thus, the vertex information is provided by decoding from the bitstream. Therein the bitstream is encoded according to the method for encoding as described before. Preferably, is encoded by a TriSoup encoding scheme at the encoder.

After decoding the octree information and vertex information from the bitstream which is described in previous one step, in a further step, for reconstructing the point cloud geometry, triangles are determined for each cuboid by connecting vertices on the edges of the cuboids. Thus, the surfaces of the triangles are determined by the position of the vertices included in the bitstream. In order to reconstruct the points of the point cloud from the triangles, voxelization is performed by a ray-tracing process wherein in the ray-tracing process rays are launched along the three directions parallel to any of the three axes. Their origin is a point of integer coordinates corresponding to the sampling precision wanted for the rendering. The intersection point (if any) of the ray with one of the triangles is then determined and added to the list of rendered points, i.e. added to the points of the point cloud. The surface of the triangles is sampled by the rays during voxelization in order to determine the points of point cloud.

Preferably, the method for encoding is further built according to the features described before in connection with the method for decoding.

In another aspect of the present invention an encoder is provided for encoding a 3D point cloud into a bitstream. The encoder comprises a memory and a processor, wherein instructions are stored in the memory, which when executed by the processor perform the steps of the method for encoding described before.

In another aspect of the present invention a decoder is provided for decoding a 3D point cloud from a bitstream. The decoder comprises a memory and a processor, wherein instructions are stored in the memory, which when executed by the processor perform the steps of the method for decoding described before.

In another aspect of the present invention a bitstream is provided, wherein the bitstream is encoded by the steps of the method for encoding described before.

Preferably, the bitstream is an MPEG G-PCC compliant bitstream.

In another aspect of the present invention a computer-readable storage medium is provided comprising instructions to perform the steps of the method for encoding a 3D point cloud into a bitstream as described above.

In another aspect of the present invention a computer-readable storage medium is provided comprising instructions to perform the steps of the method for decoding a 3D point cloud from a bitstream as described above.

BRIEF DESCRIPTION OF DRAWINGS

In the following the present invention is described in more detail with reference to the accompanying drawings.

FIG. 13 is a schematic drawing of an example for vertex positions of a leaf node according to the present disclosure.

FIG. 14 is a schematic flow diagram of the method for decoding a 3D point cloud geometry according to the present disclosure.

DETAILED DESCRIPTION

Thus, it is an object of the present invention to provide a method for encoding a geometry of its 3D point cloud into a bitstream as well as decoding of a 3D point cloud from a bitstream with increased accuracy.

Figure 1:
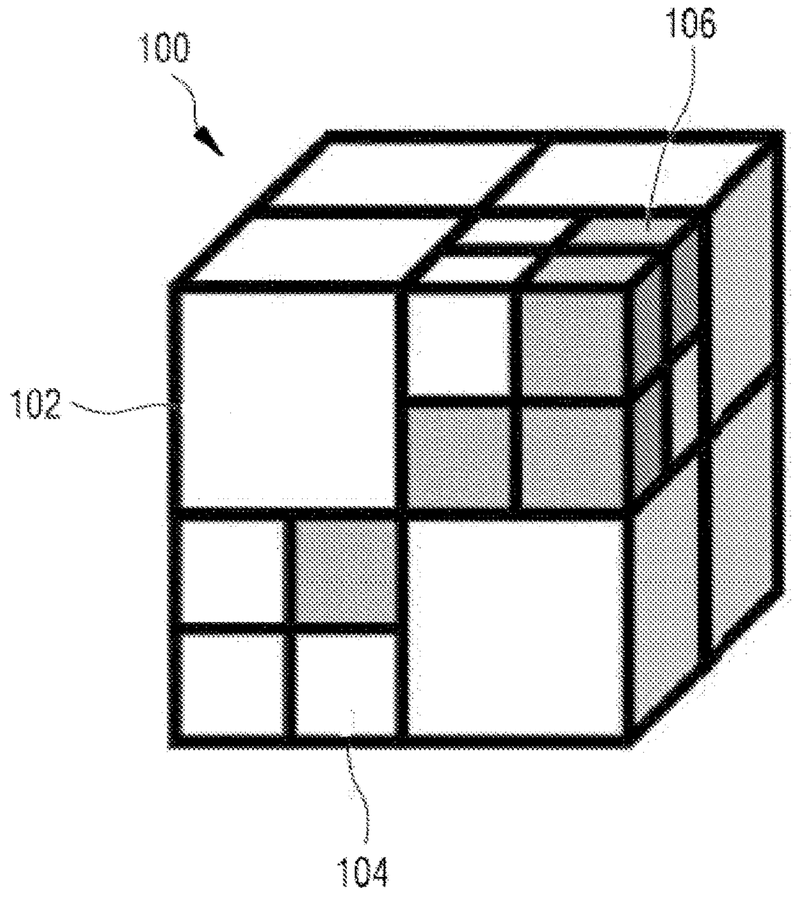
FIG. 1 is a schematic drawing of an example for generation of the octree structure.
Figure 2:
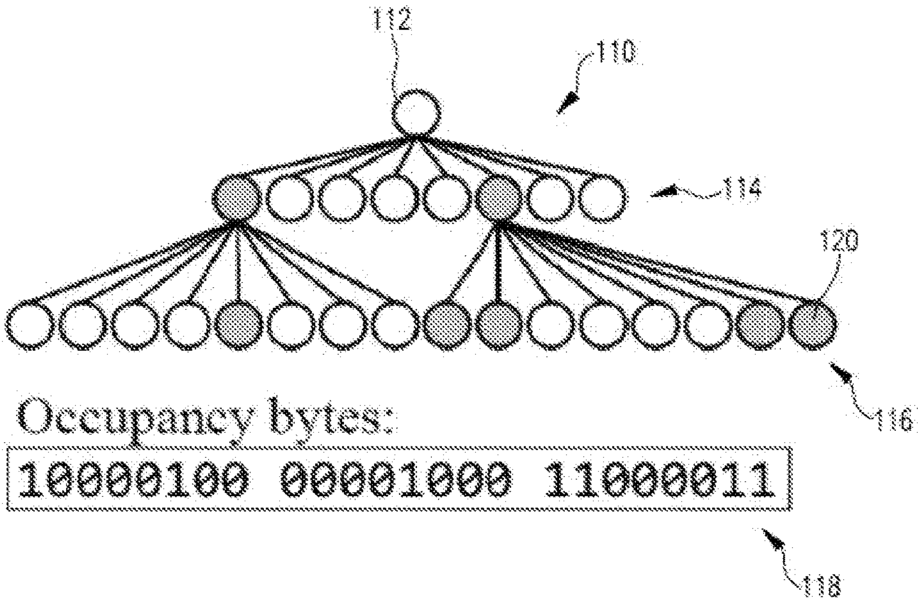
FIG. 2 is a schematic drawing of an octree according to FIG. 1.

Referring to FIG. 1. The first step of the geometry encoding process in order to determine the octree information is to build and encode an octree, as illustrated in FIGS. 1 and 2. The bounding box is the main volume 100 that contains all the points, and is associated to the root node 112 (i.e. single node at the top of the tree 110). This volume 100 is first divided into 8 sub-volumes 102 called octants, each is represented by a node 114 in the tree 110. The octants 106 that are occupied by at least one point, which are shaded in FIGS. 1 and 2, are then recursively split in sub-volumes 104 until a target level is reached.

Each octant (or node) is represented by an occupancy byte that contains one bit per child octant, set to one if it is occupied by at least one point, or to zero otherwise. The occupancy bytes 118 of all the octants are serialized (in breadth-first order) and entropy coded with a binary arithmetic encoder.

Figure 3:
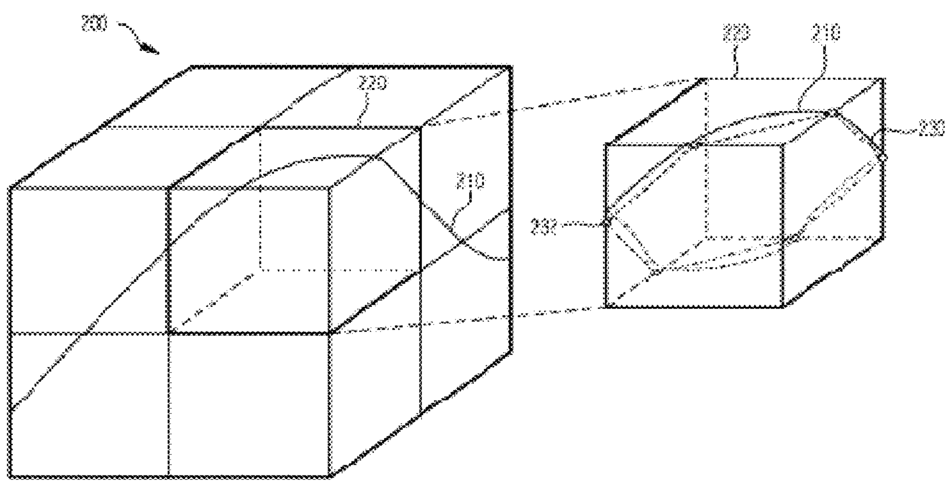
FIG. 3 is a schematic drawing of an example for determining vertices on edges of a cuboid according to the related art.

FIG. 3 illustrates a blocking representation of a 3D surface 210, as well as an example of a block 220 in a TriSoup. The surface 210 intersects the block 220, which is therefore an occupied block, and the block 220 exists among multiple blocks 200 in 3D space. Within the block 220, the enclosed portion of the surface 210 intersects the edges of the block at six illustrated vertices of a polygon 230. An edge of the block 220 is said to be selected if it contains a vertex.

Figure 4:
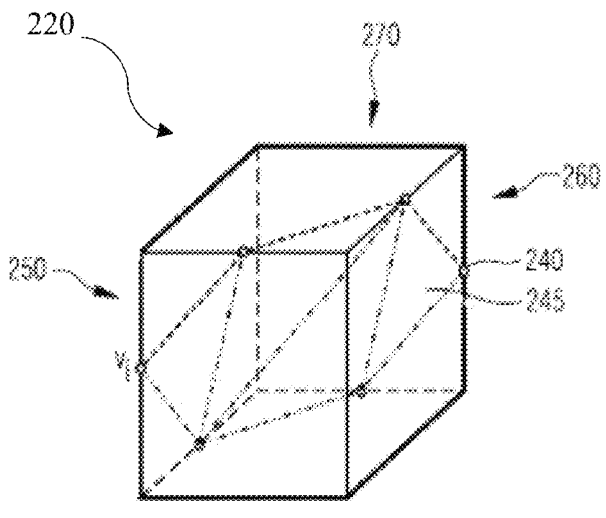
FIG. 4 is a schematic drawing of an example for generating triangles.

FIG. 4 illustrates the block 220 in the TriSoup, omitting the surface 210 for clarity, and showing a non-selected edge 270, a selected edge 260, and the i-th edge 250. Suppose the i-th edge 250 is selected. To specify a vertex Vj on edge j, one specifies a scalar value to indicate a corresponding fraction of the length of the edge 250.

As illustrated in FIGS. 3 and 4, within each octant 220 in the target level of the octree, the TriSoup represents the original surface 210 as a set of triangles 245. This surface is encoded and used to obtain the positions of the reconstructed (or decoded) points. First, the intersections of the surface represented by the original points with the edges of the octants are estimated by averaging the positions of the points that are closest to those edges within the octant. Secondly, the twelve edges of all the octants and their associated intersections (if any) are stored as segments and vertices respectively. Each (unique) segment is then encoded as follows. A first single bit is arithmetically coded, set to one if the segment is occupied by a vertex and zero otherwise. If it is occupied, the relative position of the vertex on the segment is also arithmetically coded.

Figure 5:
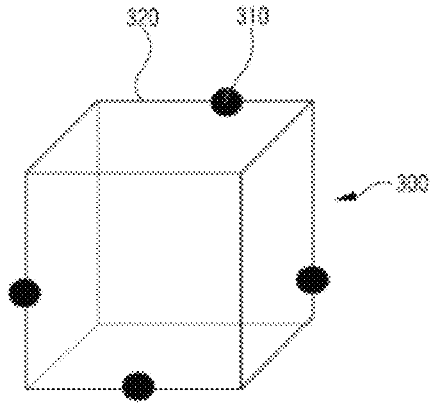
FIG. 5 is a schematic drawing of an example of vertices on the edges of a cuboid.

Vertices 310 of triangles are coded along the edges 320 of volumes associated with leaf nodes 300 of the tree, as depicted on FIG. 5. These vertices 310 on edge 320 are shared among leaf nodes 300 having a common edge 320. This means that at most one vertex is coded per edge belonging to at least one leaf node. By doing so, continuity of the model is ensured through leaf nodes.

As mentioned above, the encoding of the TriSoup vertices requires two information per edge:

- a vertex flag indicating if a TriSoup vertex is present on the edge, and when present, the vertex position along the edge.

Consequently, the coded data consists in the octree data plus the TriSoup data.

The vertex flag is coded by an adaptive binary arithmetic coder that uses one specific context for coding vertex flags. The position of a vertex on an edge of length N=2s might be coded with unitary precision by pushing (bypassing/not entropy coding) s bits into the bitstream.

Figure 6:
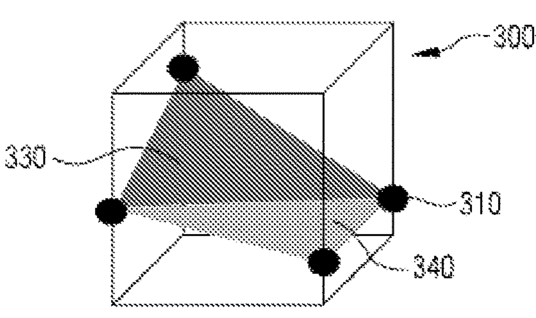
FIG. 6 is a schematic drawing of a generation of the triangles by the vertices

Inside a leaf node 300, triangles are constructed from the TriSoup vertices if at least three vertices 310 are present on the edges 320 of the leaf node 300. Reconstructed triangles 330, 340 are depicted in FIG. 6.

Obviously, other combinations of triangles 330, 340 are possible. The choice of triangles comes from a three-step process:

- determining a dominant direction along one of the three axes;
- ordering TriSoup vertices depending on the dominant direction; and
- constructing triangle based on the ordered list of vertices.

Knowledge about the exact position of the triangles within the current leaf is not necessary and can be deduced from the vertices.

Figure 7:
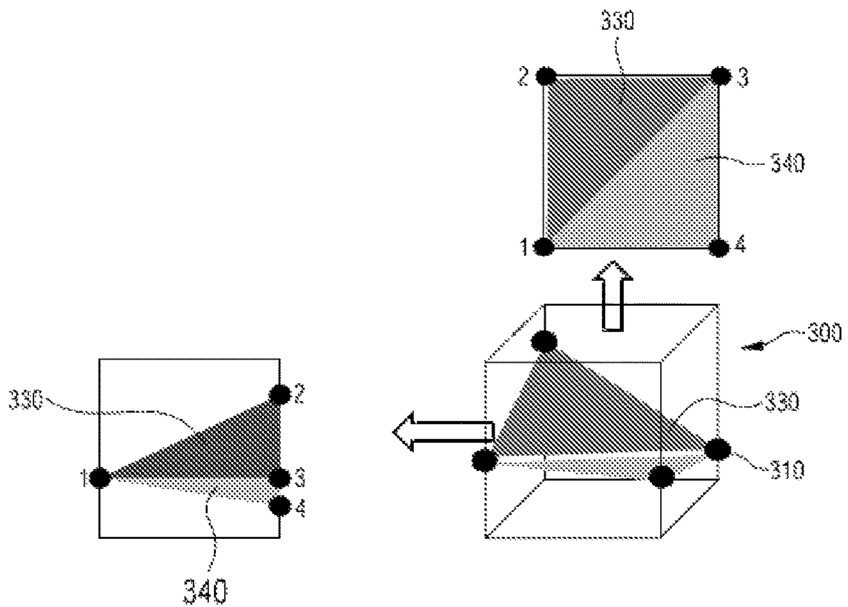
FIG. 7 is a schematic drawing of an example of determining the order of the triangles according to FIG. 6.

FIG. 7 will be used to explain this process. Each of the three axis is tested and the one maximizing the total surfaces of triangle is kept as dominant axis. For simplicity of the figure, only the test over two axis is depicted on FIG. 8.

A first test (top) along the vertical axis is performed by projecting the cube and the Trisoup vertices 310 vertically on a 2D plane. The vertices 310 are then ordered following a clockwise order relative to the center of the projected node (a square). Then, triangles 330, 340 are constructed following a fixed rule based on the ordered vertices. Here, triangles 123 and 134 are constructed systematically when 4 vertices are involved. When 3 vertices are present, the only possible triangle is 123. When 5 vertices are present, a fixed rule may be to construct triangles 123, 134 and 451. And so on, up to 12 vertices.

A second test (left) along a horizontal vertical axis is performed by projecting the cube and the Trisoup vertices horizontally on a 2D plane.

The vertical projection exhibits the 2D total surface of triangles that is maximum, thus the dominant axis is selected as vertical, and the constructed TriSoup triangles are obtained from the order of the vertical projection, as in FIG. 7 inside the node. It is to be noted that taking the horizontal axis as dominant would have led to another construction of triangles.

The adequate selection of the dominant axis by maximizing the projected surface leads to a continuous reconstruction of the point cloud without holes.

The rendering of TriSoup triangles into points is performed by ray tracing. The set of all rendered points by ray tracing will make the decoded point cloud.

Figure 8:
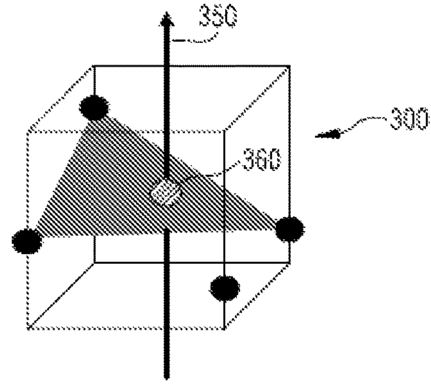
FIG. 8 is a schematic drawing for the step of voxelization.

For ray tracing as shown in FIG. 8, rays are launched along the three directions parallel to an axis 350. Their origin is a point of integer (voxelized) coordinates of precision corresponding to the sampling precision wanted for the rendering. The intersection (if any, dashed point 360) with one of the TriSoup triangles is then voxelized (=rounded to the closest point at the wanted sampling precision) and added to the list of rendered points.

After applying TriSoup to all leaf nodes, i.e. constructing triangles and obtaining points by ray tracing, copies of same points in the list of all rendered points are discarded (i.e. only one voxel is kept among all voxels sharing the same position and volume) to obtain a set of decoded (unique) points.

In current G-PCC of MPEG, the vertex along an edge of each leaf node is deduced from the closest points (relative to the edge) of the original point cloud, and the vertex determination method follows the steps:

Determine a threshold tmin as 1, to define how close points must be relative to the edge of leaf node.

Define two variables for each edge, one variable is the number Nclosest_p of closest points relative to the edge, the other variable is sum Dsum of position distance relative to origin O of the leaf node (along axis paralleling to the edge) of all the closest points relative to the edge, and they are both set as 0 initially.

Iterate each leaf node to determine variables for each edge.

Within each leaf node, iterate each point P, belonging to the leaf node, to determine which edge of the leaf node the point P is close to.

Calculate position distances ($D_x$, $D_y$, $D_z$) along each axis between position of the point P and origin O of the leaf node, which can be described by $$D_x = P_x - O_x,$$

$$D_y = P_y - O_y,$$

$$D_z = P_z - O_z.$$

Figure 9:
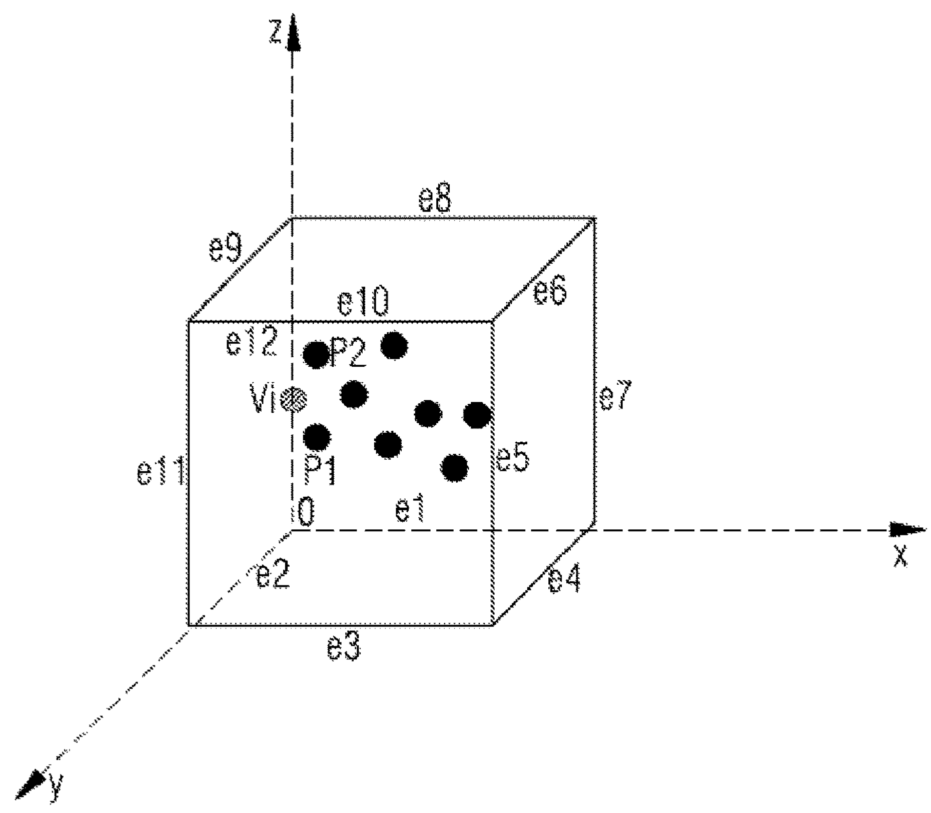
FIG. 9 is a detailed drawing of determining the vertex positions in a leaf node.

Iterate each point to compare its relative distances (represented by position distances ($D_x$, $D_y$, $D_z$)) to each edge of the leaf node and the threshold tmin. For each edge, there is a condition (determined by threshold tmin) to determine if a point is close to it or not. For example, as shown in FIG. 9, the condition (point is close to edge 12 denoted by "e12") is $D_x$<tmin and $D_y$<tmin, and the points P1 and P2 satisfies the condition.

f the point P is close to the edge, then Nclosest_p of the edge increases by 1, and Dsum of the edge is added by $D_j$, where j is the axis that parallels to the edge, for example, for point P1 in FIG. 9 along the z-axis it yields Dsum=Dsum+$D_z$. The above process can be described by equation $$\text{Nclosest\_p} = \text{Nclosest\_p} + 1,$$

$$Dsum = Dsum + D_j.$$

Put all the edges (including information of variables) into a list, sort them and find unique edges by removing duplicated edges.

Iterate each unique edge of the leaf nodes to determine the vertex presence and vertex position for each edge according to Nclosest_p and Dsum of the edge.

If Nclosest_p>0, the flag for vertex presence is true; otherwise, the flag for vertex presence is false;

If the flag for vertex presence is true, determine the vertex position along the edge by averaging the distances $D_j$ values of all the closest points.

As show in FIG. 9, there is one vertex $V_j$ (0,0,Zv) on edge 12. We can see that there are 2 closest points of edge 12, they are P1 and P2, so the coordinate Zv of vertex position can be obtained by averaging the z coordinate of P1 and P2.

After getting the flag of vertex presence and vertex position of each edge as vertex information, encode the vertex information into the bitstream. Next, this information can be used to construct the triangles in the geometry reconstructing process in encoder and also can be used to construct triangle in decoder.

In lossy compression of octree geometry coding, several compression rates are defined to satisfy different bandwidth demands. The size of leaf node under lower compression rate is larger than that of higher compression rate, for example, according to G-PCC common test condition, there are 4 compression rates, which are r01, r02, r03 and r04. And the corresponding relationship between size N of leaf node in units of sampling resolution of original point cloud data acquired by devices and compression rates r is shown in Table 1. As shown in Table 1, the leaf node size is different under different compression rates.

| r | r01 | r02 | r03 | r04 |
|---|---|---|---|---|
| N | 32 | 16 | 8 | 4 |

Table 1 corresponding relationship between size N of leaf node and compression rates r.

However, during the vertex determination in the prior art, the threshold tmin for finding the closest points is always set as 1, which is not adaptive to different leaf node size/sizes of the cuboids of leaf nodes under different compression rates, and will cause larger reconstructed errors on larger leaf node size.

From here the figures are depicted as a 2D volume (square) instead of a 3D volume (cuboid) associated with a leaf node. The reader will keep in mind that all methods described in this invention apply to the 3D space.

Figure 10:
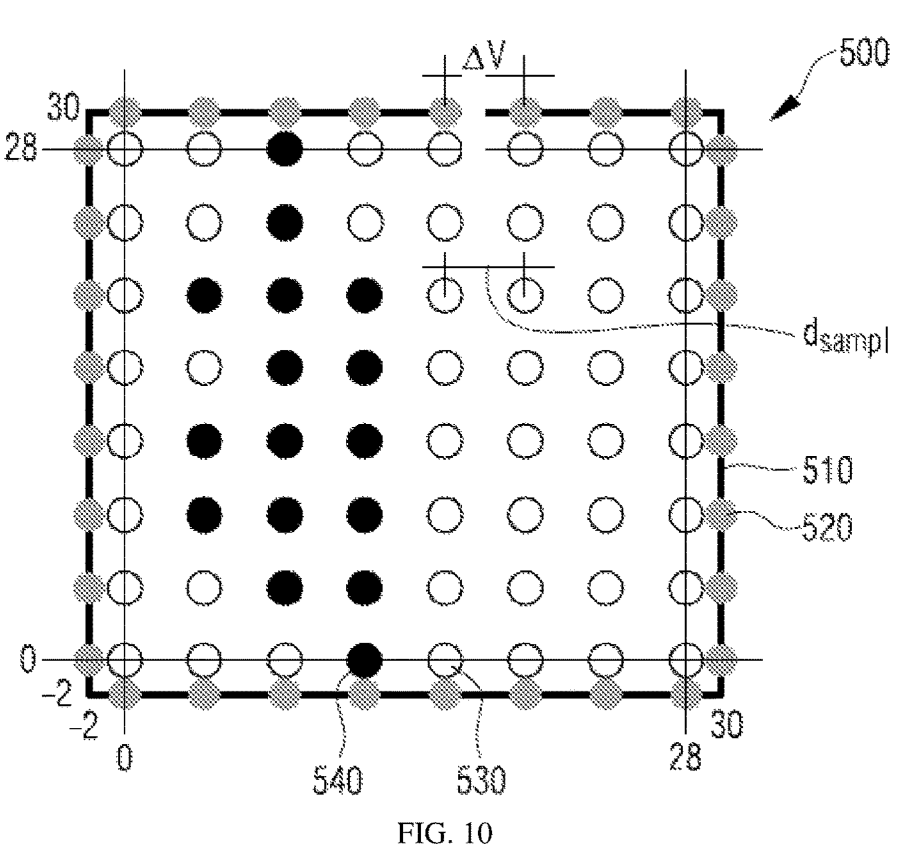
FIG. 10 is a schematic drawing of an example for determining the vertex positions according to the related art.

Referring to FIG. 10 showing a N×N×N volume of the leaf node 500 with N=2s=32. Therein, within the volume, there are 8 possible sampling points along one direction in the example of FIG. 10 but is not limited to this specific value. The actual sampling distance d sampl (as denoted in FIG. 10) is in the example of FIG. 10 equal to 4 but is not limited to this specific value. The edges 510 of the leaf node 500 are located at positions −2 and N−2 to ensure continuity of the TriSoup model when passing from a volume to an adjacent volume. Practically, this means that faces of cuboids are shared between adjacent volumes. By doing so, the position of a vertex present on an edge 510 does not depend on the cuboid the edge belongs to. Therein, the possible positions 520 of a quantized vertex wherein the quantization step ΔV is denoted in FIG. 10 and is selected in the example of FIG. 10 to be equal to 4. However, different sizes of the quantization step ΔV can be chosen for different compression rates, and in particular the quantization step ΔV is independent from the sampling distance $d_{sampl}$. In the example of FIG. 10, the distance of the closest point relative to the edge 510 of the leaf node 500 is 2, so no points in FIG. 10 satisfy the closest condition of each edge with tmin=1 as in the prior art described above. Consequently, the leaf node 500 has no vertex on any edge 510 of it, and then the TriSoup triangle will not be constructed within the leaf node 500. Thus, all the points (full circles 540) of the point cloud within the leaf node 500 are missed and will not be reconstructed in decoder, which causes the coding efficiency to be not optimal in current TriSoup coding of MPEG G-PCC. Therein, the empty circles 530 in FIG. 10 describe the sampling position according to sampling distance dsampl of one device acquiring the point cloud data of one object which is not occupied because the object may not exist at the respective position. Full circles 540 in FIG. 10 describe the sampling position of the device which is occupied because the object may exist at the respective position.

Also in some cases, because that many points within the leaf node are further from edge (compared with the distance defined by threshold tmin), there are only one or two vertices on one or two edges of the leaf node, the TriSoup triangle will not be constructed within the leaf node, because the minimum vertex number of a leaf node for constructing a TriSoup triangle is 3. So, all the points in such leaf node will be missed in reconstructed point cloud, which will also cause the coding efficiency to be not optimal.

Thus, the problem to solve is to find a method to recover the missed points in lower compression rates due to the non-adaptive threshold tmin for finding closest points of each edge.

Figure 11:
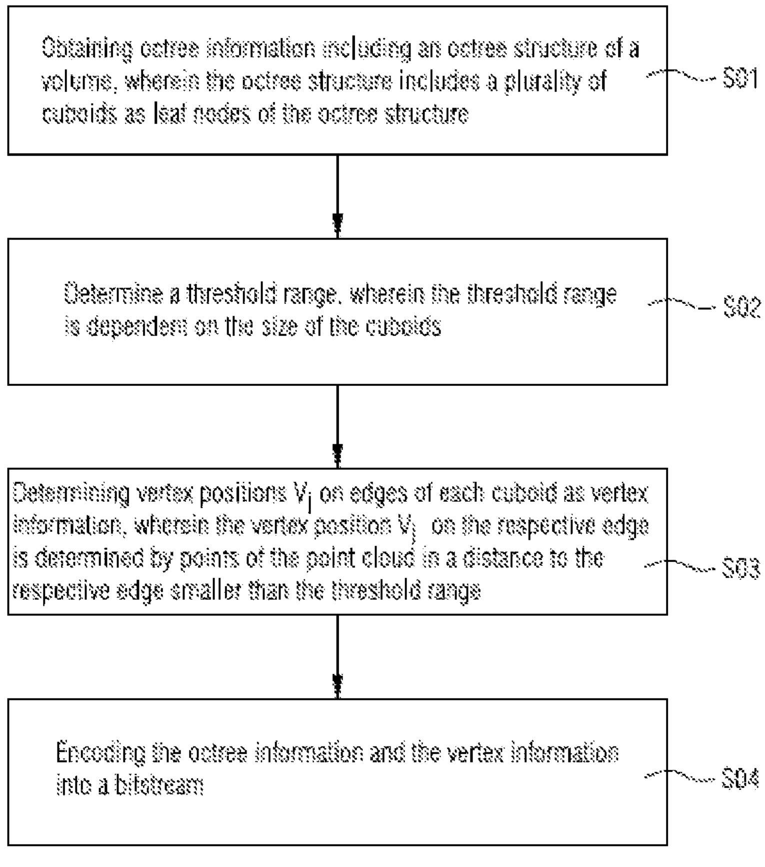
FIG. 11 is a schematic flow diagram of the method for encoding a 3D point cloud geometry according to the present disclosure.

Referring to FIG. 11 showing the method according to the present invention for encoding a 3D point cloud into a bitstream, preferably implemented in an encoder.

In step S01 octree information is obtained including an octree structure of a volume, wherein the octree structure includes a plurality of cuboids as leaf nodes of the octree structure In step S02 a threshold range is determined, wherein the threshold range is dependent on the size of the cuboids.

In step S03 vertex positions $V_j$ on edges of each cuboid are determined as vertex information, wherein the vertex position $V_j$ on the respective edge is determined by points of the point cloud in a distance to the respective edge smaller than the threshold range; and In step S04 the octree information and the vertex information are encoded into a bitstream.

Figure 12:
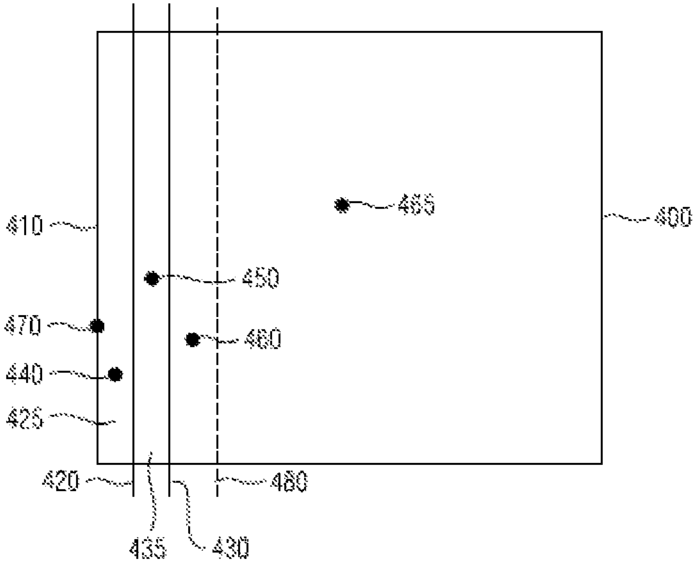
FIG. 12 is a schematic drawing of a detailed embodiment of the present invention.

Referring to FIG. 12 illustrating the details of the present invention for one leaf node 400. In FIG. 12 the vertex position on edge 410 shall be determined. Several points 440, 450, 460, 465 are within the leaf node 400. In order to determine the vertex position 470 on edge 410, a first threshold range $t1_{min}$ 420 is defined thereby defining a first range 425, wherein the points within this first range 425 are considered when determining the vertex position. In the example of FIG. 12, one point 440 is within the first range 425 determined by the first threshold range $t1_{min}$ 420. Therein, according to the present invention the first threshold range 420 might be a fixed value as in the prior art and might be equal to 1. According to the present invention, a second threshold range $t2_{min}$ 430 is defined, defining a second range 435, wherein points in this second range 435 are also considered when determining the vertex position 470 on the edge 410. In the example of FIG. 12, one point 450 is within the second range 435 defined by the second threshold range 430. Point 450 would not be considered in the prior art since it is outside the usual threshold range. However, due to defining the second threshold range $t2_{min}$ 430 the additional point 450 is also considered when determining the vertex position on edge 410.

According to the present invention, further second threshold ranges 480 may be defined in order to consider more points when determining the vertex position on the edge 410 of the leaf node 400. Therein, in the example of FIG. 12 point 460 might also be considered when defining further second threshold ranges 480.

Further, points 465 within the leaf node 400 in a distance to the respective edge 410 larger than the second threshold range 430 are not considered when determining the vertex position 470 on the edge 410. Thus, in the example of FIG. 12 point 440 in the first range 425 and point 450 in the second range 435 are considered when determining the vertex position 470 on the edge 410. If there is at least one point of the point cloud within the first range 425 or the second range 435, a vertex is present on the edge 410 and a vertex position 470 is determined. Of course, if further threshold ranges 480 are provided, if at least one point of the point cloud within the first range 425, the second range 435 or at least any further ranges defined by the further second threshold ranges 480 is present, a vertex on the edge 410 is determined.

In the method according to one embodiment of the present invention, the vertex position determination of each leaf node follows the steps:

Determine two thresholds:

A first threshold range $t1_{min}$ might be fixed and set as 1, to define how closest points must be relative to the edge of leaf node; A second threshold range $t2_{min}$ is set as the second search range dSearchEnc, to miss less points under lower compression rates.

Define two pairs of variables for each edge:

One pair of variables are: the number Nclosest_p1 of most closest points (distance relative to the edge is defined by first threshold range $t1_{min}$), the and sum Dsum1 of position distance relative to origin O of the cuboid of the leaf node (along axis paralleling to the edge) for all the most closest points relative to the edge. Another pair of variables are: the number Nclosest_p2 of second closest points (distance relative to the edge is defined by second threshold range $t2_{min}$), and the sum Dsum2 of position distance relative to origin O of the cuboid of the leaf node (along axis paralleling to the edge) for all the second closest points relative to the edge. And all the variables are set as 0 initially.

Iterate each leaf node to get the two pairs of variables for each edge.

Within each leaf node, iterate each point P, belonging to the leaf node, to determine which edge of the leaf node the point P is close to, by using the two thresholds.

Calculate position distances ($D_x$, $D_y$, $D_z$) along each axis between position of the point P and origin O of the leaf node, which can be described as $$D_x = P_x - O_x,$$

$$D_y = P_y - O_y,$$

$$D_z = P_z - O_z.$$

Iterate each point to compare its relative distances (represented by position distances ($D_x$, $D_y$, $D_z$)) to each edge of the leaf node and the first and second threshold ranges $t1_{min}$ and $t2_{min}$. For each edge, there are two conditions to determine if a point is closest to it or not. Condition 1 is determined by the first threshold range $t1_{min}$, and Condition 2 is determined by the second threshold range $t2_{min}$. Condition 1 is $D_j<t1_{min}$, Condition 2 is $D_j<t2_{min}$. Relative to Condition1, Condition 2 is a more relax condition for each point P in leaf node.

If the point P in the leaf node satisfies Condition 1 of one edge, then Nclosest_p1 of the edge increases by 1, and Dsum1 of the edge is added by $D_j$, where j is the axis that parallels to the edge. The above process can be described by equation $$\text{Nclosest\_p1} = \text{Nclosest\_p1} + 1,$$

$$Dsum1 = Dsum1 + D_j.$$

And if the point P in the leaf node satisfies Condition 2 of one edge, then Nclosest_p2 of the edge increases by 1, and Dsum2 of the edge is added by $D_j$, where j is the axis that parallels to the edge. The above process can be described by equation $$\text{Nclosest\_p2} = \text{Nclosest\_p2} + 1,$$

$$Dsum2 = Dsum2 + D_j.$$

Put all the edges (including information of variables) into a list, sort them and find unique edges by removing duplicated edges.

Iterate each unique edge to determine the vertex presence and vertex position for each edge according to variables Nclosest_p1, Nclosest_p2 and Dsum1, Dsum2 of the edge. In detail:

If Nclosest_p1>0 or Nclosest_p2>1, then the flag for vertex presence of the edge is true; otherwise, the flag for vertex presence of the edge is false.

If the flag for vertex presence of the edge is true, then determine the vertex position along the edge by averaging the distances $D_j$ values of all the most closest points and all the second closest points; wherein the averaging method gives larger weights for variables of the most closest points. In one embodiment, the vertex position can be obtained by $$V_j = (W1 * Dsum1 + W2 * Dsum2)/(W1 * \text{Nclosest\_p1} + W2 * \text{Nclosest\_p2})$$

Preferably, points of the point cloud in a distance to the respective edge smaller than the first threshold range $t1_{min}$ are weighted by a first weight (or weighting factor) W1 and points of a point cloud in a distance to the respective edge smaller than the second threshold range $t2_{min}$ are weighted by a second weight (or weighting factor) W2. Therein, W1 is larger than W2 such that positions of the points in a distance to the respective edge smaller than the at least one second threshold range have less impact compared to positions of the points in a distance to the respective edge smaller than the first threshold when determining the respective vertex position.

Therein, the weights or weighting factors W1 and W2 may be fixed values. Preferably W1 is set to be between 1 and 4 and more preferably W1=2. Alternatively or additionally W2 is preferably set to be between 0.2 and 2 and more preferably W2=1. Alternatively, the weight W1 is determined by the ratio of the second threshold range $t2_{min}$ and the first threshold range $t1_{min}$, i.e. $W1=t2_{min}/t1_{min}$ and W2=1.

The effect of the proposed vertices determination method is depicted on FIG. 13, wherein same elements are denoted with same reference signs as in FIG. 10. In FIG. 13, the second threshold range $t2_{min}$ is used to determine the vertices 580 on the edges 510 of the leaf node 500', with $t2_{min}>t1_{min}$. Thus, compared with FIG. 10 (wherein only one fixed threshold range is used to determine the vertices), vertices 580 are present at three edges 510 and their positions are determined for the leaf node 500', which can be used to construct TriSoup triangle 560 for reconstructing point cloud. Thus, most of the points in the leaf node 500' will not be missed. Therein, vertex positions 580 are determined as described above by points of the point cloud (full circles 540) within the first threshold range $t1_{min}$ and the second threshold range $t2_{min}$. The calculated position 570 is then quantized to the next possible vertex position 520 on the respective edge 510 to be considered when constructing the TriSoup triangle 560.

In yet another variant, the proposed vertices determination method is used only for lower compression rates, i.e. r01 or for r01 and r02 and not for r03 and r04 for example, since it has stable and much better gains on lower compression rates with larger leaf node size.

The advantages of the proposed method are a lesser geometry distortion of the decoded point cloud. Practically, quantitative metrics show a better performance with 13.2% gains on BDBR. Therein, the complexity of the TriSoup scheme is not substantially increased because the invention is a small modification of original algorithm.

In one embodiment, the second threshold range $t2_{min}$ might be determined on the basis of a sampling distance dsampl of the point cloud. The sampling distance $d_{sampl}$ of original point cloud can be estimated according to the total number $N_{total}$ of input points, the number $N_{leaf}$ of leaf nodes and the size N of leaf node. Firstly, the total point number of the point cloud can be estimated by $$N_{total} \sim N_{leaf\_points} * N_{leaf}$$

wherein $N_{leaf\_points}$ is the point number in each leaf node, which can be estimated as $$N_{leaf\_points} \approx N^2 / d_{sampl}^2.$$

Therein, the total number $N_{total}$ of input points can be obtained from the preceding encoding process. Finally, the sampling distance dsampl of the original point can be approximated as $$d_{sampl} \approx sqrt\left(\frac{N_{leaf}}{N_{total}}\right) * N.$$

As shown in the equation of $d_{sampl}$, $d_{sampl}$ depends on the leaf node size N.

The second threshold range $t2_{min}$ is to relax the condition to find more close points relative to edge of leaf node, and it is used by combing with the threshold $t1_{min}$ used in prior art.

The second threshold range $t2_{min}$ may depend on the sampling distance $d_{sampl}$, which depends on leaf node size N; Further, the second threshold range $t2_{min}$ may additionally or alternatively depend on a quantization step ΔV of vertex position, since the precision of point position is reduced by log 2 (ΔV) because of quantization process to obtain vertex position used for reconstructing TriSoup triangle.

It has been observed that a reasonable value for the weight of quantization step $\Delta V$ is ¼, so in an embodiment, the second threshold range $t2_{min}$ is obtained by $$t2_{min} = d_{sampl} + \alpha\,\Delta V.$$

In the preceding embodiment, the conditions to find closest points relative to edge of leaf node are defined by two search ranges defined by two thresholds ranges: $t1_{min}$ and $t2_{min}$. In one variant, for simplicity, only one search range $t2_{min}$ is used, wherein $t2_{min}$ depends on the size of the cuboids of the leaf node. In another variant, 3 or 4 search ranges ($t1_{min}$, $t2_{min}$, $t3_{min}$, ($t4_{min}$)) are used, wherein $t1_{min}<t2_{min}<t3_{min}<t4_{min}$ to achieve scalable search ranges and find more closer points relative to edges of leaf point.

For example the individual threshold ranges can be determined by:

$$t1_{min} = 1,$$

$$t2_{min} = d_{samp} + \frac{1}{4} * \Delta V,$$

$$t3_{min} = 2 * d_{samp} + \frac{1}{4} * \Delta V, \text{ and}$$

$$t4_{min} = 3 * d_{samp} + \frac{1}{4} * \Delta V.$$

The principle is $$tN_{min} = (N-1) * d_{samp} + \frac{1}{4} * \Delta V.$$

Then when iterating each point P to determine vertex for each edge of the leaf nodes, for each edge there will be 3 or 4 conditions to find the closest points within the leaf nodes, namely Condition 1 is $D_j<t1_{min}$, Condition 2 is $D_j<t2_{min}$, Condition 3 is $D_j<t3_{min}$, Condition 4 would be $D_j<t4_{min}$, and so on.

In another embodiment, the sampling distance used for the second search range $t2_{min}$ can be obtained from a parameter, for example, in the Geometry Parameter Set (GPS).

In another embodiment, the weights for the position of closest points can depend on the relationship between two thresholds: $t1_{min}$ and $t2_{min}$, for example, the vertex position can be obtained by $$V_j = (W1 \times D_{sum1} + W2 \times D_{sum2})/(W1 \times N_{closest\_p1} + W2 \times N_{closest\_p2}),$$

with $W1=t2_{min}/t1_{min}$ and $W2=1$.

In one embodiment, if there are 3 search ranges, the weights for variables of closest points can depend on the relationship between three thresholds: $t1_{min}$, $t2_{min}$ and $t3_{min}$. The vertex position can be obtained by $$V_j = (W1 \times D_{sum1} + W2 \times D_{sum2} + W3 \times D_{sum3})/(W1 \times N_{closest\_p1} + W2 \times N_{closest\_p2} + W3 \times N_{closest\_p3}),$$

with $W1=t3_{min}/t1_{min}$, $W2=t2_{min}/t1_{min}$ and $W3=1$. Therein Nclosest_p3 is the number of third closest points (distance relative to the edge is defined by threshold $t3_{min}$), and Dsum3 is the sum of position distance (relative to origin O of the leaf node along axis paralleling to the edge) for all the third closest points relative to the edge.

And if there are 4 search ranges, the weights for variables of closest points can depend on the relationship between four thresholds: $t1_{min}$, $t2_{min}$, $t3_{min}$ and $t4_{min}$. The vertex position can be obtained by:

$$V_j = (W1 \times D_{sum1} + W2 \times D_{sum2} + W3 \times D_{sum3} + W4 \times D_{sum4})/(W1 \times N_{closest\_p1} + W2 \times N_{closest\_p2} + W3 \times N_{closest\_p3} + W4 \times N_{closest\_p4})$$

with $W1=t4_{min}/t1_{min}$, $W2=t3_{min}/t1_{min}$, $W3=t2_{min}/t1_{min}$ and $W4=1$, wherein Nclosest_p4 is the number of fourth closest points (distance relative to the edge is defined by threshold $t4_{min}$), and Dsum4 is the sum of position distance (relative to origin O of the leaf node along axis paralleling to the edge) for all the fourth closest points relative to the edge.

Referring to FIG. 14 showing a flow diagram of the method for decoding a 3D point cloud geometry according to the present invention, preferably implemented in a decoder.

In step S10 a bitstream is received and decoded, wherein the bitstream contains octree information including about octree structure of the volume of the point cloud and vertex information including information about vertex presence and position of a vertex on edges of cuboids of leaf nodes of the octree structure.

In step S11 triangles are determined by connecting the vertices of one cuboid relating to a leaf node of the octree structure.

In step S12 points of the decoded 3D point cloud is determined by voxelization of the triangles.

Figure 15:
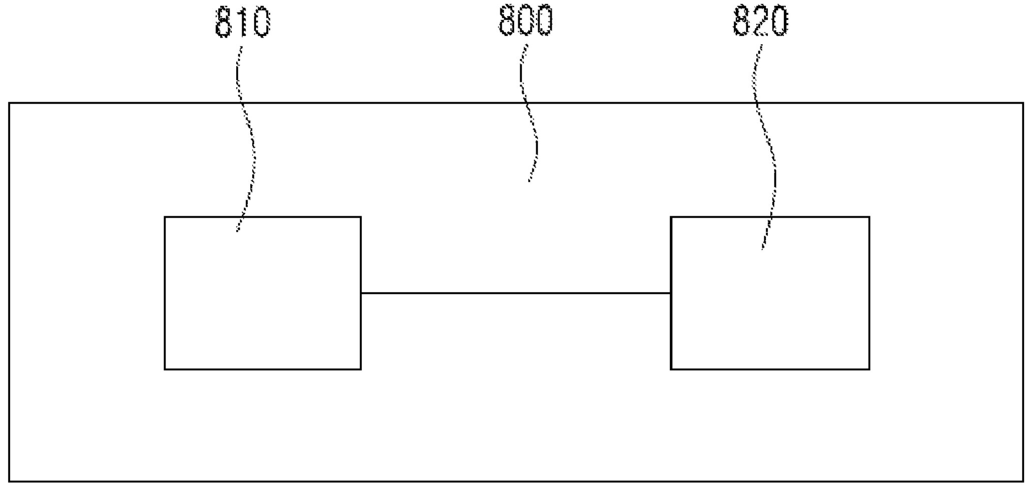
FIG. 15 is a schematic drawing of an encoder according to the present invention.

Reference is now made to FIG. 15, which shows a simplified block diagram of an example embodiment of an encoder 800. The encoder 800 includes a processor 810 and a memory storage device 820. The memory storage device 820 may store a computer program or application containing instructions that, when executed, cause the processor 810 to perform operations such as those described herein. For example, the instructions may encode and output bitstreams encoded in accordance with the methods described herein. It will be understood that the instructions may be stored on a non-transitory computer-readable medium, such as a compact disc, flash memory device, random access memory, hard drive, etc. When the instructions are executed, the processor 810 carries out the operations and functions specified in the instructions so as to operate as a special-purpose processor that implements the described process (es). Such a processor may be referred to as a "processor circuit" or "processor circuitry" in some examples.

Figure 16:
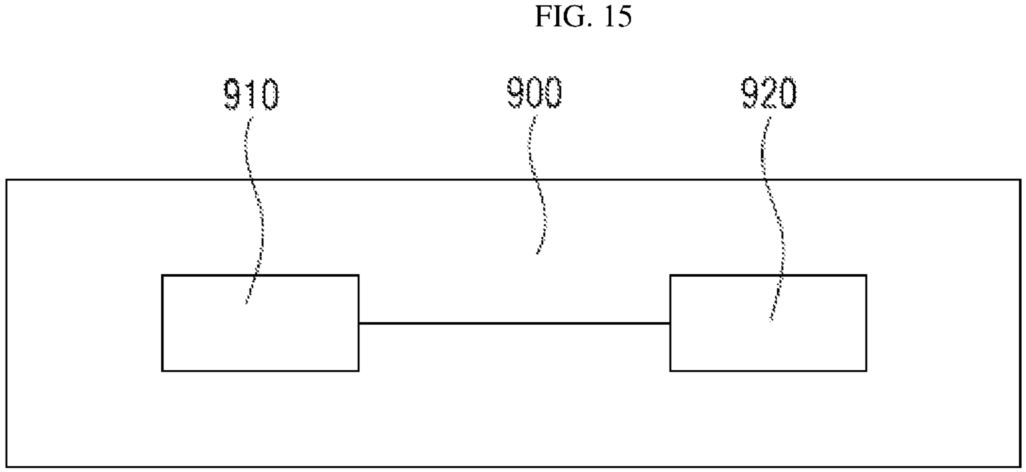
FIG. 16 is a schematic drawing of a decoder according to the present disclosure.

Reference is now also made to FIG. 16, which shows a simplified block diagram of an example embodiment of a decoder 900. The decoder 900 includes a processor 910 and a memory storage device 920. The memory storage device 920 may include a computer program or application containing instructions that, when executed, cause the processor 910 to perform operations such as those described herein. It will be understood that the instructions may be stored on a computer-readable medium, such as a compact disc, flash memory device, random access memory, hard drive, etc.

When the instructions are executed, the processor 910 carries out the operations and functions specified in the instructions so as to operate as a special-purpose processor that implements the described process(es) and methods. Such a processor may be referred to as a "processor circuit" or "processor circuitry" in some examples.

It will be appreciated that the decoder and/or encoder according to the present application may be implemented in a number of computing devices, including, without limitation, servers, suitably programmed general purpose computers, machine vision systems, and mobile devices. The decoder or encoder may be implemented by way of software containing instructions for configuring a processor or processors to carry out the functions described herein. The software instructions may be stored on any suitable non-transitory computer-readable memory, including CDs, RAM, ROM, Flash memory, etc.

It will be understood that the decoder and/or encoder described herein and the module, routine, process, thread, or other software component implementing the described method/process for configuring the encoder or decoder may be realized using standard computer programming techniques and languages. The present application is not limited to particular processors, computer languages, computer programming conventions, data structures, other such implementation details. Those skilled in the art will recognize that the described processes may be implemented as a part of computer-executable code stored in volatile or non-volatile memory, as part of an application-specific integrated chip (ASIC), etc.

The present application also provides for a computer-readable signal encoding the data produced through application of an encoding process in accordance with the present application.

Certain adaptations and modifications of the described embodiments can be made. Therefore, the above discussed embodiments are considered to be illustrative and not restrictive. In particular, embodiments can be freely combined with each other.

The invention claimed is:

1. A method for encoding a three-dimensional point cloud into a bitstream, performed by an encoder, the method comprising:

obtaining octree information comprising an octree structure of a volume, wherein the octree structure comprises a plurality of cuboids as leaf nodes of the octree structure;

determining a threshold range;

determining vertex positions $V_j$ on edges of each cuboid as vertex information, wherein the vertex position $V_j$ on the respective edge is determined by points of the point cloud in a distance to the respective edge smaller than the threshold range; and encoding the octree information and the vertex information into a bitstream;

wherein the threshold range is dependent on sizes of the cuboids; and the threshold range comprises a first threshold range $t1_{min}$ and at least one second threshold range $t2_{min}$, wherein the at least one second threshold range $t2_{min}$ is larger than the first threshold range $t1_{min}$, wherein the first threshold range $t1_{min}$ is fixed and the at least one second threshold range $t2_{min}$ is dependent on the sizes of the cuboids, and the vertex position V; on the respective edge is determined by $$V_j=(W1\times D_{sum1}+W2\times D_{sum2})/(W1\times N_{closest\_p1}+W2\times N_{closest\_p2}),$$

wherein W1 and W2 are weighting factors, $D_{sum1}$ is a sum of positions along the respective edge of points in a distance to the respective edge smaller than the first threshold range $t1_{min}$ and $N_{closest\_p1}$ is a number of the points, and $D_{sum2}$ is a sum of the positions along the respective edge of points in a distance to the respective edge smaller than the at least one second threshold range $t2_{min}$ and $N_{closest\_p2}$ is a number of the points.

2. The method according to claim 1, wherein the at least one second threshold range $t2_{min}$ is determined based on a sampling distance $d_{sampl}$ of the point cloud.

3. The method according to claim 2, wherein the sampling distance $d_{sampl}$ of the point cloud is determined by $$d_{sampl}=\sqrt{\frac{N_{leaf}}{N_{total}}}\cdot N,$$

with $N_{leaf}$ being a number of the leaf nodes, $N_{total}$ being a number of points in the point cloud and N being a size of a respective cuboid of the leaf node.

4. The method according to claim 1, wherein the at least one second threshold range $t2_{min}$ is determined based on a quantization step ΔV of the vertex position on the edge.

5. The method according to claim 4, wherein the quantization step ΔV is multiplied by a factor α, wherein a is between ⅛ and 1 or between ⅛ and ¼.

6. The method according to claim 4, wherein the the at least one second threshold range $t2_{min}$ is determined by a sum of a sampling distance $d_{sampl}$ of the point cloud and the quantization step ΔV.

7. The method according to claim 1, wherein positions of the points are weighted depending on their distance to the respective edge when determining the vertex position.

8. The method according to claim 1, wherein more than one second threshold range $t2_{min}$, $t3_{min}$ are provided, wherein $t2_{min}<t3_{min}$.

9. A method for decoding, from a bitstream, geometry of a three-dimensional (3D) point cloud, performed by a decoder, the method comprising:

receiving and decoding the bitstream, wherein the bitstream contains octree information comprising information about an octree structure of a volume of the point cloud and vertex information comprising information about vertex presence and position of a vertex on edges of cuboids of leaf nodes of the octree structure;

determining triangles by connecting the vertices of one cuboid relating to a leaf node of the octree structure; and performing voxelization of the triangles to determine points of the decoded point cloud;

wherein the position of the vertex is determined based on a threshold range dependent on sizes of the cuboids and comprising a first threshold range $t1_{min}$ and at least one second threshold range $t2_{min}$, wherein the at least one second threshold range $t2_{min}$ is larger than the first threshold range $t1_{min}$, wherein the first threshold range $t1_{min}$ is fixed and the at least one second threshold range $t2_{min}$ is dependent on the sizes of the cuboids, and the vertex position $V_j$ on the respective edge is determined by $$V_j=(W1\times D_{sum1}+W2\times D_{sum2})/(W1\times N_{closest\_p1}+W2\times N_{closest\_p2}),$$

wherein W1 and W2 are weighting factors, $D_{sum1}$ is a sum of positions along the respective edge of points in a distance to the respective edge smaller than the first threshold range $t1_{min}$ and $N_{closest\_p1}$ is a number of the points, and $D_{sum2}$ is a sum of the positions along the respective edge of points in a distance to the respective edge smaller than the at least one second threshold range $t2_{min}$ and $N_{closest\_p2}$ is a number of the points.

10. An encoder to encode a three-dimensional point cloud into a bitstream, the encoder comprising:

at least one processor; and a memory storing instructions executable by the processor;

wherein the processor is configured to perform:

obtaining octree information comprising an octree structure of a volume, wherein the octree structure comprises a plurality of cuboids as leaf nodes of the octree structure;

determining a threshold range;

determining vertex positions $V_j$ on edges of each cuboid as vertex information, wherein the vertex position $V_j$ on the respective edge is determined by points of the point cloud in a distance to the respective edge smaller than the threshold range; and encoding the octree information and the vertex information into a bitstream;

wherein the threshold range is dependent on sizes of the cuboids, and the threshold range comprises a first threshold range $t1_{min}$ and at least one second threshold range $t2_{min}$, wherein the at least one second threshold range $t2_{min}$ is larger than the first threshold range $t1_{min}$, wherein the first threshold range $t1_{min}$ is fixed and the at least one second threshold range $t2_{min}$ is dependent on the sizes of the cuboids, and the vertex position V; on the respective edge is determined by $$V_j = (W1 \times D_{sum1} + W2 \times D_{sum2})/(W1 \times N_{closest\_p1} + W2 \times N_{closest\_p2}),$$

wherein W1 and W2 are weighting factors, $D_{sum1}$ is a sum of positions along the respective edge of points in a distance to the respective edge smaller than the first threshold range $t1_{min}$ and $N_{closest\_p1}$ is a number of the points, and $D_{sum2}$ is a sum of the positions along the respective edge of points in a distance to the respective edge smaller than the at least one second threshold range $t2_{min}$ and $N_{closest\_p2}$ is a number of the points.

11. A decoder to decode a 3D point cloud from a bitstream, the decoder comprising:

at least one processor; and a memory storing instructions executable by the processor;

wherein the processor is configured to perform the method according to claim 9.

12. A non-transitory computer-readable storage medium storing instructions that, when executed by a processor, cause the processor to perform the method according to claim 1.

13. A non-transitory computer-readable storage medium storing instructions that, when executed by a processor, cause the processor to perform the method according to claim 9.

14. The encoder according to claim 10, wherein the threshold range comprises a first threshold range $t1_{min}$ and at least one second threshold range $t2_{min}$, wherein the at least one second threshold range $t2_{min}$ is larger than the first threshold range $t1_{min}$, wherein the first threshold range $t1_{min}$ is fixed and the at least one second threshold range $t2_{min}$ is dependent on the sizes of the cuboids.

15. The encoder according to claim 14, wherein the at least one second threshold range $t2_{min}$ is determined on the basis of a sampling distance $d_{sampl}$ of the point cloud.

16. The encoder according to claim 15, wherein the sampling distance $d_{sampl}$ of the point cloud is determined by $$d_{sampl} = \sqrt{\frac{N_{leaf}}{N_{total}}} \cdot N,$$

with $N_{leaf}$ being a number of the leaf nodes, $N_{total}$ being a number of points in the point cloud and N being a size of a respective cuboid of the leaf node.

17. The encoder according to claim 14, wherein the at least one second threshold range $t2_{min}$ is determined on a basis of a quantization step ΔV of the vertex position on the edge.

18. The encoder according to claim 17, wherein the quantization step ΔV is multiplied by a factor α, wherein a is between ⅛ and 1 or between ⅛ and ¼.

* * * * *